United States Patent [19]
Pizzotti et al.

[11] 3,799,633
[45] Mar. 26, 1974

[54] ROLLING BEARING OF SMALL AXIAL BULK ADAPTED FOR SUPPORTING RADIAL FORCES AND MOMENTS

[75] Inventors: Ugo Pizzotti; Domenico Camosso; Giovanni Pollastro, all of Torino, Italy

[73] Assignee: SKF Industrial Trading and Development Company B.V., Amsterdam, Netherlands

[22] Filed: Feb. 22, 1973

[21] Appl. No.: 334,811

[30] Foreign Application Priority Data
Mar. 16, 1972  Italy................................ 67834/72

[52] U.S. Cl. ............................................. 308/183
[51] Int. Cl. ............................................ F16c 19/00
[58] Field of Search........................... 308/183, 191

[56] References Cited
UNITED STATES PATENTS
2,617,688  11/1952  Stewart.............................. 308/183

Primary Examiner—Charles J. Myhre
Assistant Examiner—Frank Susko
Attorney, Agent, or Firm—Ladas, Parry, Von Gehr, Goldsmith & Deschamps

[57] ABSTRACT

A rolling bearing having two coaxial elements rotatable one with respect to the other by way of two rings of rolling bodies which roll on races in these elements is described. The two rings are of different diameters and the rolling bodies of one ring are situated at an axial distance from the rolling bodies of the other ring of not greater than 20 percent of the diameter of a rolling body of the ring which comprises rolling bodies of small dimensions.

10 Claims, 5 Drawing Figures

3,799,633

ROLLING BEARING OF SMALL AXIAL BULK ADAPTED FOR SUPPORTING RADIAL FORCES AND MOMENTS

BACKGROUND OF THE INVENTION

The present invention relates to a rolling bearing of small axial bulk adapted for operating with a system of loads comprising radial forces and moments such as is met with for example in the case of a rotating member supported projecting from the frame of the mechanical unit on which it is mounted.

In machine design, constructional dispositions are frequently provided comprising a rolling bearing or an assembly of bearings in which a system of loads acts on the aforementioned bearing or assembly which can be reduced to a single radial force and a pure moment. Dispositions of this type are met with for example when a rotating member is supported in a projecting manner or when, more generally, one or more radial forces are applied to a rotating member the resultant of which lies in a plane which does not pass through the bearing which supports it or which is external to that part of the member which lies between the two bearings constituting the supports for said member.

When the aforementioned condition arises, one of the two following constructional forms is substantially chosed.

In a first constructional form two rolling bearings are used situated at an axial distance apart sufficient to enable the said pure moment to be balanced by the moment generated by the induced reactions on the bearings, and which is proportional to said distance.

A further constructional form may be obtained by choosing a bearing provided with two rings of spheres spaced axially apart and hence able to resist moments as well as radial forces. Constructional forms in which a rolling bearing or a number of rolling bearings are used for supporting a rotating member in a cantilevered manner are described in the two German utility model applications No. G 7004815.6 and No. G 7004816.7 of 12 Feb. 1970.

Both the constructional forms stated give rise to disadvantages. Firstly, their axial bulk is rather large. In fact, this axial bulk is due to the presence of two adjacent bearing (first case) or tow adjacent rings of spheres (second case) and to the said axial distance between the bearings or rings which has to be fairly high in order to limit the reactions exchanged between the revolving bodies and the races of the bearings. Moreover, the assembly of these bearings requires the use of further mechanical members such as distance pieces and clamping devices and must be carried out with particular care.

SUMMARY OF THE INVENTION

The object of the present invention is to provide a rolling bearing comprising at least two coaxial elements rotatable one with respect to the other by way of two rings of rolling bodies which roll on races in these elements, which enables the aforementioned disadvantages to be eliminated.

The rolling bearing of the invention comprises a first and second coaxial elements rotatable one with respect to the other and provided with rolling races; two rings of rolling bodies which roll on said rolling races of said elements; said two rings being of different diameter and the rolling bodies of one ring being situated at an axial distance from the rolling bodies of the other ring of not greater than 20 percent of the diameter of a rolling body of the ring which comprises rolling bodies of small dimensions; on said first element there being formed two of said rolling races for said rolling bodies, one for each of said rings, the normals at the points of contact of each of the races with the relative rolling bodies pertaining to the same conical surface the vertex of which is situated on the other side of the vertex of the other conical surface with respect to a plane normal to the axis of the bearing; and on said second element there being formed other two of said rolling races for said rolling bodies on each of which the rolling bodies of one of said two rings roll.

BRIEF DESCRIPTION OF THE DRAWINGS

For a better understanding of the present invention, a description of two embodiments will now be given by way of example, with reference to the accompanying drawings in which.

DETAILED DESCRIPTION OF THE INVENTION

Figure 1:
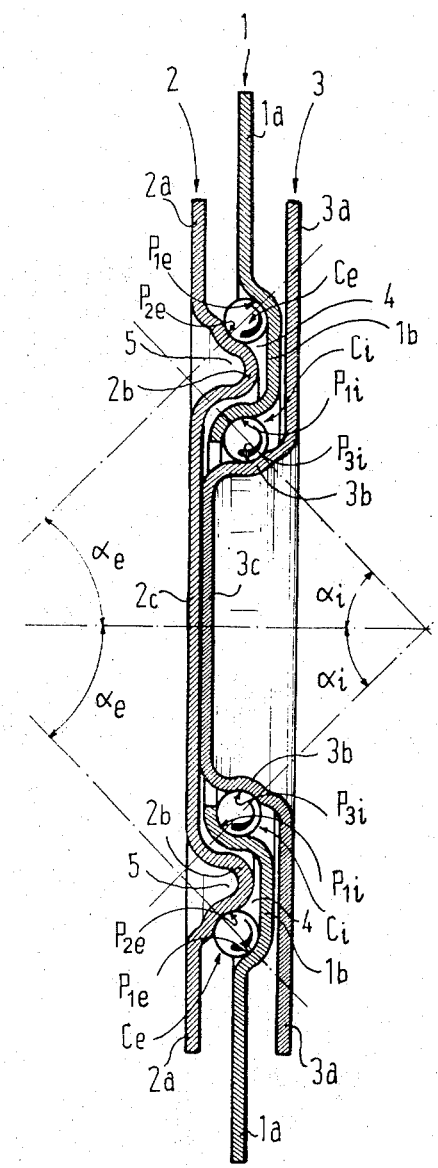
FIG. 1 is a vertical section through a rolling bearing according to a first embodiment of the present invention.
Figure 2:
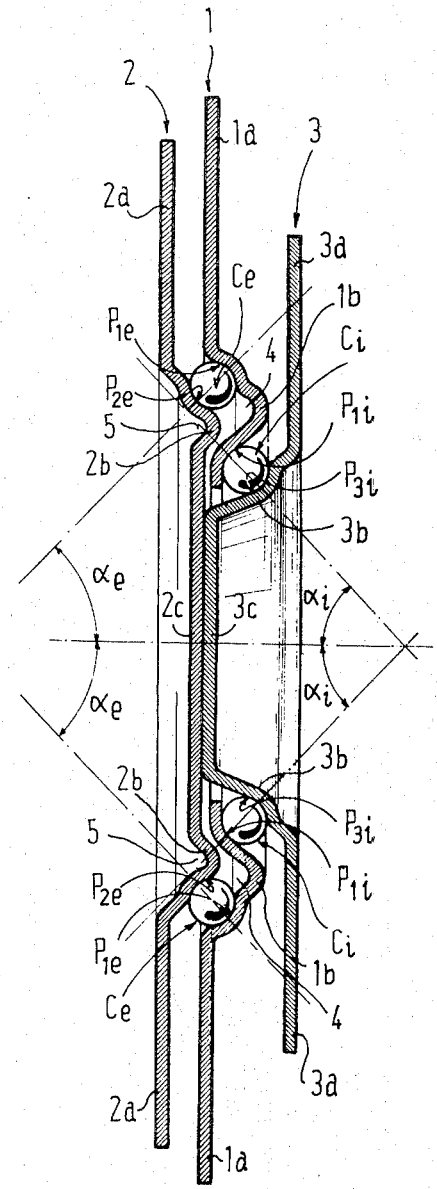
FIG. 2 is a vertical section through a rolling bearing according to a second embodiment of the present invention.

With reference to FIGS. 1 and 2, the rolling bearing according to the invention comprises substantially an intermediate ring 1, on which are formed two coaxial rolling races for rolling bodies, an internal one indicated by $P_{1i}$, and an external one indicated by $P_{1e}$, and two discs 2 and 3 on each of which is formed a race for said rolling bodies, indicated respectively by $P_{2e}$ and $P_{3i}$. The races $P_{1e}$ and $P_{2e}$ substantially define a compartment of annular form between the ring 1 and disc 2 and constitute rolling seats for an external ring of spheres $C_e$, and the rolling races $P_{1i}$, $P_{3i}$, define an annular compartment between the ring 1 and disc 2 and constitute the rolling seats for an internal ring of spheres $C_i$.

The diametrical profile of the surfaces of the rolling races $P_{1e}$ and $P_{2e}$ is such that the normals to these surfaces passing through the points of contact between the spheres and surfaces pertain to the same conical surface, having its axis coincident with the axis of the bearing and a semiangle of $\alpha_e$. Likewise, the profile of the surfaces of the rolling races $P_{1i}$ and $P_{3i}$ is such that the normals to these surfaces passing through the points of contact between the spheres and surfaces pertain to the same conical surface, having an axis coincident with the axis of the bearing and a semiangle of $\alpha_i$. Conveniently, as is usual in the case of races for rolling bearings, each of the surfaces of said races has as its generating line an arc of a circumference. The vertices of the conical surfaces firstly defined are on opposite sides of the plane which contains the centres of the spheres of the corresponding rings $C_e$ or $C_i$. Although the angles $\alpha_e$ and $\alpha_i$ may have any value and may be different one from the other, for the reasons which will be explained hereinafter, it is convenient to choose $\alpha_i = \alpha_e = 45°$.

The embodiment shown in FIG. 2 differs from that shown in FIG. 1 only by the fact that the planes which contain the centres of the spheres of the rings $C_i$ and $C_e$ are not coincident, but the axial distance between the spheres of the two said rings is equal or less than 20 percent of the diameter of the spheres (supposed all of the same diameter) or 20 percent of a sphere of the ring which contains spheres of smaller diameter. This limitation in the distance between the spheres enables a bearing to be obtained having a small axial bulk, less than that met with in known rolling bearings which comprise two rings of spheres axially spaced apart. Furthermore, previous known bearings, because of their particular constructional disposition, do not permit an axial distance between the rings of spheres equal or less than the value indicated above.

In the two embodiments shown, the intermediate ring 1 and discs 2 and 3 are constructed of sheet metal and the rolling races $P_{1e}$, $P_{2e}$, $P_{1i}$ and $P_{3i}$ are obtained by plastic deformation of said sheet metal using techniques known to the art. In order to obtain rolling races of the form heretofore described, the ring 1 comprises an external peripheral part 1a, arranged to constitute the fixing flange for the ring, and an internal part 1b substantially defining an annular cavity 4. The disc 2 also comprises an external peripheral part 2a defining a connecting flange, an intermediate part 2b configured so as to define an annular cavity 5, and an internal circular and substantially flat part 2c. The disc 3 comprises an external peripheral part 3a defining a connection flange, an intermediate part 3b projecting laterally with respect to the preceding, and an internal part 3c also of circular substantially flat form. The internal parts 2c and 3c are in contact and are fixed one to the other in any convenient manner, for example by welding, riveting or the like.

Each of the peripheral connecting parts 1a, 2a, 3a, may be arranged for fixing in any convenient manner to parts or members of the mechanical device in which the revolving bearing according to the invention is used. To this end, holes may be formed in said parts or any other known fixing means may be associated with them.

It is thus evident that the rolling bearing according to the invention comprises only two elements rotatable one with respect to the other on the spheres of the rings $C_i$ and $C_e$, of which one consists of the ring 1 and the other of the assembly of discs 2 and 3 rigid one with the other. This bearing is of very small axial bulk, because the centres of the spheres of the two said rings are contained in the same plane, as in the case of the embodiment of FIG. 1, or are at an axial distance apart equal or less than 20 percent of the diameter of one sphere of the rings. Furthermore, radial forces, pure moments or loading systems obtained by combining radial forces with moments may be applied to the described bearing, as will be further explained hereinafter. After fixing the disc 3 to the disc 2, the bearing constitutes a single complex the parts of which cannot be separated from each other, even before mounting. Finally, as the structure of this bearing and the shape of the parts of which it is constituted are simple, it can be produced at low cost.

Figure 3:
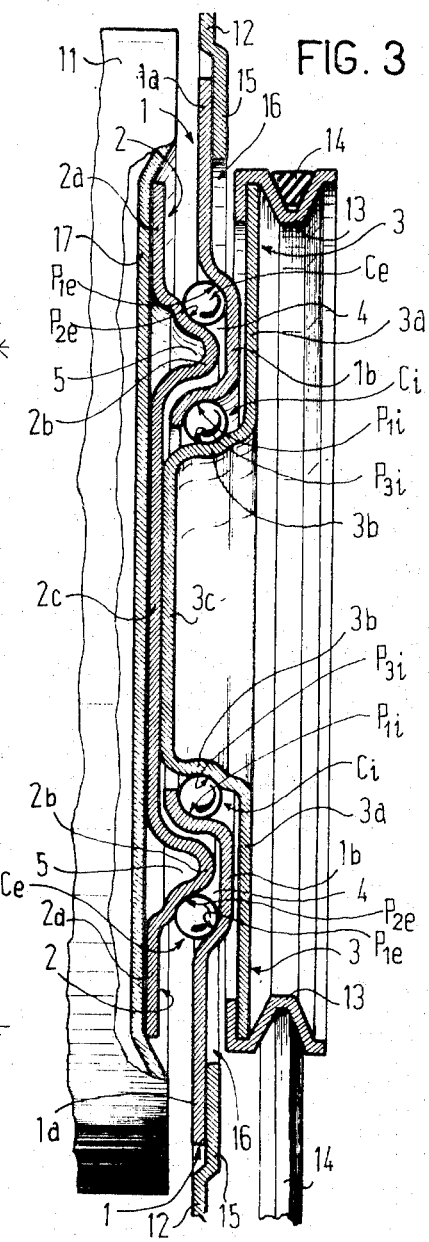
FIG. 3 is a partly sectional lateral view of part of a mechanical unit in which a rolling bearing corresponding to the first embodiment of the present invention is used.

FIG. 3 shows an example of utilization of the rolling bearing according to the invention. In this constructional form, a bearing corresponding to the embodiment shown in FIG. 1 carries a rotating member 11 which is mounted in a cantilevered manner with respect to a wall 12 of a mechanical unit. The stated condition (cantilevered assembly of a rotating member) is met with in certain household electrical machines, for example in washing machines, in which the rotating member 11 consists of the washing machine drum.

In order to form this constructional arrangement, a pulley 13 is fixed to the peripheral part 3a of the disc 3 in any convenient manner, for example by welding, and in the case illustrated this is arranged for use with a V belt 14 and is constructed of sheet metal. The peripheral part 1a of the ring 1 is connected in any convenient manner, for example by screws (not shown), to the edge 15 of a hole 16 formed in the wall 12. The rotating member 11, in particular the drum of a washing machine, is fixed to the external peripheral part 2a of the disc 2, by connecting it for example to a bottom wall 17 with which said member is provided.

The assembly and method of operation of the rolling bearing according to the invention are as follows.

The intermediate ring 1 is normally fixed to a fixed part of the mechanical unit on which the bearing is to be mounted, for example in the case of the constructional disposition shown in FIG. 3, to the wall 12. Two different rotating members, for example the member 11 (FIG. 3) and pulley 13 may be fixed to the peripheral parts 2a and 3a. When one of the two discs 2 or 3 is made to rotate, for example by the V belt 14 wound on the pulley 13, there is relative rotation of the assembly of discs 2 and 3 with respect to the intermediate ring 1 and consequently rolling of the spheres of the rings $C_i$ and $C_e$ on their corresponding races, $P_{1i}$, $P_{3i}$ and $P_{1e}$, $P_{2e}$ respectively.

Figure 4:
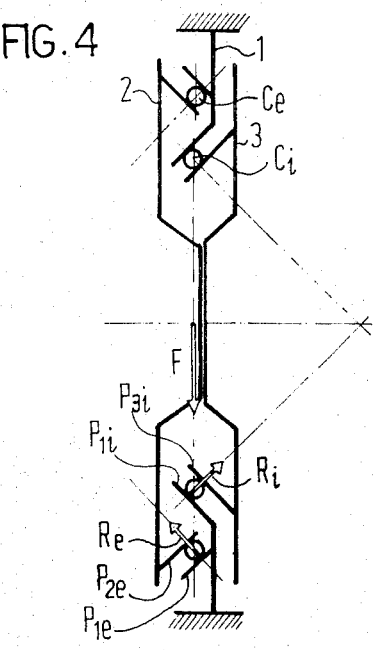
FIGS. 4 and 5 are two diagrammatic representations of the rolling bearing of the embodiment shown in FIG. 1, which show two different loading conditions and the reactions exchanged between rolling bodies and rolling seats of the bearing and produced by said loads.

It is supposed initially that in a general condition of operation of the rolling bearing, the load system (forces and moments) applied to each of the two discs 2 and 3 is such as to give rise to only one resultant radial force F (FIG. 4) lying in the plane in which the centres of the spheres of the rings $C_i$ and $C_e$ lie. This condition may be realized for example in a constructional disposition of the type shown in FIG. 3, when the radial force due to the tension of the belt 14 generates a moment which tends to rotate the assembly of discs 2 and 3 in the clockwise direction equal to the moment in the opposite direction generated by the weight of the rotating member 11 which is supposed to be concentrated and applied at the centre of gravity of the member. When this condition arises, i.e. when the bearing of the invention has to support only a radial load F (FIG. 4) and if it is supposed for simplicity that this load is supported only by the spheres of the rings $C_i$ and $C_e$ located on the diametrical plane which contains the load, then on the races $P_{1i}$ and $P_{1e}$ in contact with the two lower spheres in the diagram shown in FIG. 4, reactions arise, $R_i$ and $R_e$ respectively, normal to the sphere-race contact surfaces having an absolute value such that the sum of the relative components in the direction of the load F is equal to the absolute value of the load itself. Obviously, as the elastic system shown diagrammatically is a statically indeterminable system, $R_i$ does not generally equal $R_e$, but the ratio of these forces depends on the rigidity of the coupled parts between which the stated reactions are exchanged.

Figure 5:
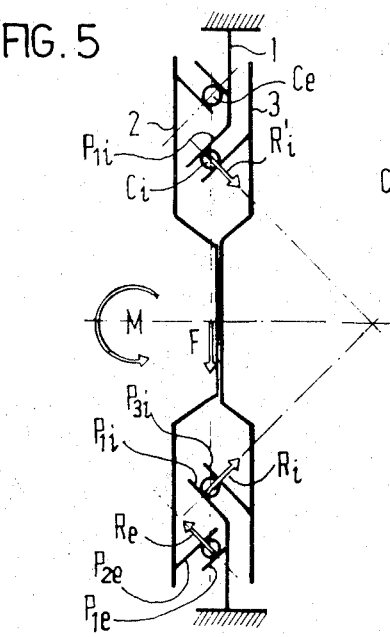

If it is supposed instead that the system of forces applied to the discs 2 and 3 gives rise both to a resultant radial force F as in the case just examined and to a resultant moment M (FIG. 5) supposed for simplicity to act in the same plane as the load F, and if it is further supposed that only the spheres contained in the diametrical plane containing the stated force and moment react to this system, then because of the presence of the moment there will be in addition to the reactions $R_e$ and $R_i$ a further reaction $R'_i$ (FIG. 5) exchanged between the race $P_{1i}$ and the sphere in contact with it, i.e. the upper one in FIG. 5. In the statically indeterminable elastic system studied, the stated complex of reactions is able to balance the load system consisting of the force F and moment M. Even though only the two loading conditions shown in FIGS. 4 and 5 have been examined, it is evident that the bearing according to the invention is able to resist radial forces, pure moments, and a load system consisting of radial forces and pure moments.

It is further obvious that in order to increase the load capacity of the bearing according to the invention to radial forces (forces F), it is necessary to choose small angles $\alpha_i$ and $\alpha_e$, whereas to increase the load capacity relative to moments (moments M) it is necessary to choose large angles $\alpha_i$ and $\alpha_e$. A good load capacity for load systems consisting of radial forces and moments is obtained by choosing $\alpha_i = \alpha_e = 45°$, which can be considered the preferred condition for the bearing according to the invention.

Although in the illustrated and described embodiments of the invention the rolling bodies consist of spheres, it is evident that a bearing may be constructed with the same inventive concept by using rolling bodies of different shape, for example by rollers. Moreover the intermediate ring 1 and discs 2 and 3 instead of being made from sheet metal by plastic deformation operations, may be made from any semi-finished pieces plus machining. In this case the shape of said ring and discs may be conveniently different to that shown, provided a bearing is formed in which rolling races $P_{1i}$, $P_{3i}$, $P_{1e}$, $P_{2e}$ are formed having the characteristics previously described. A particularly convenient form for these discs is obtained by making each of them from a semi-finished part in sheet metal having a triangular profile and three equal sides. In this manner, instead of having an annular peripheral part of the type as indicated by 2a or 3a, each disc would be provided with three arms, each of which would be arranged for connection, in the same manner as the said part, to a member of the mechanical unit on which the bearing is used. This constructional solution gives both a better utilization of the strip of sheet metal from which each disc is obtained (because of the absence of scrap), and a reduction in the weight of the discs (because of the smaller quantity of material for the same useful diameter of the disc).

It is evident that modifications and variations may be made to the described embodiment of the present invention, both in its form and in the disposition of the various parts, without leaving the scope of the invention itself.

What we claim is:

1. A rolling bearing comprising:
   a first and second coaxial elements rotatable one with respect to the other and provided with rolling races;
   two rings of rolling bodies which roll on said rolling races of each elements;
   said two rings being of different diameter and the rolling bodies of one ring being situated at an axial distance from the rolling bodies of the other ring of not greater than 20 percent of the diameter of a rolling body of the ring which comprises rolling bodies of smaller dimensions;
   on said first element there being formed two of said rolling races for said rolling bodies, one for each of said rings, the normals at the points of contact of each of the races with the relative rolling bodies pertaining to the same conical surface the vertex of which is situated on the other side of the vertex of the other conical surface with respect to a plane normal to the axis of the bearing;
   and on said second element there being formed other two of said rolling races for said rolling bodies on each of which the rolling bodies of one of said two rings roll.

2. A rolling bearing as claimed in claim 1, wherein the centres of the rolling bodies of both said rings lie in a single plane normal to the axis of the bearing.

3. A rolling bearing as claimed in claim 1, wherein the semiangle of said two conical surfaces is the same and is equal to 45°.

4. A rolling bearing as claimed in claim 1, wherein said second element comprises two parts joined together, on each of which is formed one of said two rolling races.

5. A rolling bearing as claimed in claim 4, wherein each of said two parts is in the form of a disc, and said first element is in the form of a ring, said first element being located between two said parts of the second element.

6. A rolling bearing as claimed in claim 4, wherein said first element and said two parts of the second element are constructed of sheet metal.

7. A rolling bearing as claimed in claim 4 and apt to be mounted in a mechanical unit, wherein at least one of said two parts of the second element and said first element are provided with a fixing part arranged for connection to a corresponding part of said mechanical unit.

8. A rolling bearing as claimed in claim 7, wherein said fixing part is in the form of an annular flange.

9. A rolling bearing as claimed in claim 7, wherein a pulley is associated with one of said fixed parts of the second element, either formed in one piece with said part or fixed to the part.

10. A rolling bearing as claimed in claim 7, wherein said mechanical unit is provided with a fixed wall and wherein said fixing part of the first element is arranged for fixing to said fixed wall.

* * * * *